United States Patent
Chen et al.

(10) Patent No.: US 11,218,199 B2
(45) Date of Patent: Jan. 4, 2022

(54) METHOD FOR INTELLIGENT REFLECTING SURFACE AIDED TERAHERTZ SECURE COMMUNICATION SYSTEM

(71) Applicant: University of Electronic Science and Technology of China, Chengdu (CN)

(72) Inventors: Zhi Chen, Chengdu (CN); Xinying Ma, Chengdu (CN); Wenjie Chen, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 17/084,601

(22) Filed: Oct. 29, 2020

(65) Prior Publication Data

US 2021/0288698 A1 Sep. 16, 2021

(30) Foreign Application Priority Data

Mar. 10, 2020 (CN) .......................... 202010162635.7

(51) Int. Cl.
*H04B 7/0456* (2017.01)
*H04B 7/06* (2006.01)
*H04B 7/145* (2006.01)
*H04L 29/06* (2006.01)

(52) U.S. Cl.
CPC ......... *H04B 7/0456* (2013.01); *H04B 7/0617* (2013.01); *H04B 7/145* (2013.01); *H04L 63/0428* (2013.01)

(58) Field of Classification Search
CPC .................................................. H04B 7/0456
See application file for complete search history.

(56) References Cited

U.S. PATENT DOCUMENTS

| | | | | |
|---|---|---|---|---|
| 6,078,047 A | * | 6/2000 | Mittleman | G01N 21/49 250/330 |
| 2008/0315098 A1 | * | 12/2008 | Itsuji | G01J 3/42 250/330 |
| 2011/0098033 A1 | * | 4/2011 | Britz | H01Q 3/44 455/422.1 |

(Continued)

OTHER PUBLICATIONS

Intelligent Reflecting Surface Enhanced Wireless Network via Joint Active and Passive Beamforming. Qingqing Wu (Year: 2019).*

*Primary Examiner* — Hsinchun Liao
(74) *Attorney, Agent, or Firm* — Bayramoglu Law Offices LLC

(57) ABSTRACT

A design method for an intelligent reflecting surface (IRS) aided terahertz secure communication system is provided. The IRS aided terahertz multi-input single-output (MISO) system includes a base station (BS) equipped with $N_{BS}$ antennas, an IRS equipped with $N_{IRS}$ reflecting elements, a single-antenna user and a single-antenna eavesdropper. The BS transmits signals by the active hybrid beamforming to the relay of the IRS, and the IRS adjusts the signals and reflects the signals to the mobile user, which suppresses the received signal of the eavesdropper. The present invention maximizes the downlink secrecy rate by establishing a joint optimization function and maximizes the system data transmission rate by a cross-entropy based search method.

1 Claim, 2 Drawing Sheets

(56) References Cited

U.S. PATENT DOCUMENTS

2015/0263429 A1* 9/2015 Vahidpour ............... H01Q 1/36
                                                    343/770
2019/0115667 A1* 4/2019 Liang .................... H01Q 15/18

* cited by examiner

US 11,218,199 B2

METHOD FOR INTELLIGENT REFLECTING SURFACE AIDED TERAHERTZ SECURE COMMUNICATION SYSTEM

CROSS REFERENCE TO THE RELATED APPLICATIONS

This application is based upon and claims priority to Chinese Patent Application No. 202010162635.7, filed on Mar. 10, 2020, the entire contents of which are incorporated herein by reference.

TECHNICAL FIELD

The present invention belongs to the technical field of high-frequency wireless communication, and more particularly relates to a design method for an intelligent reflecting surface (IRS) aided terahertz secure communication system.

BACKGROUND

With the rapid expansion of wireless communication technology, academia and industry pay more attention to the exploitation and utilization of high-frequency spectrum resources. These resources include terahertz frequency band. However, terahertz communication has challenges in practical application scenarios. First, due to the severe path attenuation and molecular absorption loss, terahertz communication is limited to short-range indoor scenarios. Second, because of the strong directivity and poor diffraction of terahertz waves, the terahertz wave is more likely to be blocked by indoor obstacles, like furniture and walls.

To address these problems, an intelligent reflecting surface (IRS) is proposed, which can effectively improve the coverage range and spectral efficiency of a terahertz communication system. Specifically, the IRS is able to change the direction of the terahertz wave by adjusting phase shifts for each reflecting element. And thus, the secrecy rate of the communication system can be improved. One of the simplest schemes to control the phase shifts of the IRS is the exhaustive search method, which can obtain the maximal secrecy rate by comparing all the possible phase-shift combinations for all the reflecting elements. The calculation of the exhaustive search method, however, is extremely complicated.

SUMMARY

The objective of the present invention is to optimize the secrecy rate for the IRS aided terahertz multi-input single-output (MISO) secure communication system, where a cross-entropy based method for phase search is disclosed to reduce the phase search complexity of IRS elements and to improve the secrecy rate of the system simultaneously. In the present invention, the estimated phase shift matrix of the IRS is successively updated according to the principle of maximizing the secrecy rate during the iterative process, so as to decrease the optimal phase search complexity of the IRS and to achieve the basically consistent secrecy rate performance with the optimal exhaustive search method. In addition, the secrecy rate performance of the present invention is superior to the terahertz MISO secure communication system without the IRS.

The technical solution of the present invention is a design method for an IRS aided terahertz secure communication system, which can improve the data transmission rate of the downlink terahertz MISO system by designing the phase shifts of all the reflecting elements in the downlink terahertz MISO system. In this system, a base station (BS) equipped with $N_{BS}$ antennas communicates to a single-antenna mobile authorized user, while a single-antenna eavesdropper exists. To assist this communication, an IRS with $N_{IRS}$ reflecting elements is installed in the communication process to enhance the signals of the authorized user and to suppress the signals of the eavesdropper. In the downlink terahertz MISO secure communication, the transmission signals can be sent to the relay with the IRS by active beamforming at the BS, and the IRS reflects the signals to the mobile authorized user side by adjusting the phase shift of each reflecting element. In this way, the received signals of the eavesdropper can be greatly restricted and thus the secure communication performance can be enhanced accordingly. One may note that the recently disclosed IRS and the traditional relays are different in that the IRS composed of passive components just passively reflects the received electromagnetic waves and cannot realize the signal processing, which greatly reduces the power consumption of the system. For the IRS aided terahertz system, assuming that a working frequency of the system is f, an optional discrete phase set of each reflecting element of the IRS is F, a channel between the BS and the IRS is $H_t$, a channel between the IRS and the authorized user is $h_{ru}$, a channel between the BS and the authorized user is $h_{du}$, a channel between the IRS and the eavesdropper is $h_{re}$, a channel between the BS and the eavesdropper is $h_{de}$, an average receiving power is $\rho$ and a channel noise power is $\delta^2$.

The phase shift design method of the IRS includes:
maximizing the downlink secrecy rate $R_{sec}=[R_U-R_E]^+$, where $R_U$ is the data transmission rate of the authorized user and $R_E$ is the transmission data rate of the eavesdropper, $R_U$ and $R_E$ are expressed as follows:

$$R_U = \log_2\left[1 + \frac{|\sqrt{\rho}\,(h_{ru}^H \Theta H_t^H + h_{du}^H)F|^2}{\delta_u^2}\right],$$

$$R_E = \log_2\left[1 + \frac{|\sqrt{\rho}\,(h_{re}^H \Theta H_t^H + h_{de}^H)F|^2}{\delta_e^2}\right],$$

where F is a precoding matrix at the BS, and $\Theta$ is the phase shift matrix at the IRS. Further, the equation $R_{sec}=[R_U-R_E]^+$ means that when $R_{sec}=[R_U-R_E]>0$, $R_{sec}=R_U-R_E$, otherwise $R_{sec}=0$. Since the optimal value of the optimization problem must be more than 0, the equation $R_{sec}=R_U-R_E$ is always satisfied.

By jointly optimizing two matrix variables F and $\Theta$ to maximize the secrecy rate, establishing an objective function as follows:

$$(\Theta^{opt}, F^{opt}) = \arg\max R_{sec},$$
$$\text{s.t. } \theta_n \in F, \forall n = 1, \ldots, N_{IRS},$$
$$\Theta = diag\left(\left[e^{j\theta_1}, e^{j\theta_2}, \ldots, e^{j\theta_{N_{IRS}}}\right]^T\right),$$
$$\|F\|_F^2 = 1;$$

where the first constraint comes from the discretization of phase shifts of the reflecting element of the IRS, the second constraint comes from the communication model of the IRS, and the third constraint comes from the normalized transmission power. The optimal precoding matrix $F^{opt}$ and the phase shift matrix $\Theta^{opt}$ are obtained by solving the objective function.

The method for solving the objective function includes:

S1, performing an initialization, wherein an optional phase set of the IRS is $$F = \left\{0, \frac{2\pi}{2^b}, L, \frac{2\pi}{2^b}(2^b - 1)\right\},$$

where b is a bit quantization number; an initial probability phase shift matrix of the IRS is $$p^{(O)} = \frac{1_{2^b \times N_{IRS}}}{2^b},$$

where $$1_{2^b \times N_{IRS}}$$

is an all-ones matrix with size $2^b \times N_{IRS}$; the total number of iterations of the algorithm is $I_1$, and the current iteration of the algorithm is $i_1=1$; the total number of the iteration of the sub-algorithm is $I_2$, and the current iteration of the sub-algorithm is $i_2=1$; the number of samples for each iteration is S, and the number of optimal phase shift matrix samples for each iteration is $S_{elite}$;

S2, when $i_1 \le I_1$, cyclically performing S3-S11;

S3, computing the optimal precoding matrix $F^{opt}=u_{max}(A,B)/\|u_{max}(A,B)\|^2$, where $u_{max}(A,B)$ is a generalized eigenvector based on the largest generalized eigenvalue of matrix $B^{-1}A$, and the matrix A and the matrix B are expressed as follows:

$$A = I_{N_{BS}} + \frac{\rho}{\delta_u^2}(h_{ru}^H \Theta H_t^H + h_{du}^H)^H (h_{ru}^H \Theta H_t^H + h_{du}^H),$$

$$B = I_{N_{BS}} + \frac{\rho}{\delta_e^2}(h_{re}^H \Theta H_t^H + h_{de}^H)^H (h_{re}^H \Theta H_t^H + h_{de}^H);$$

where $I_{N_{BS}}$ is an identity matrix with size $N_{BS} \times N_{BS}$;

S4, when $i_2 \le I_2$, cyclically performing S5-S10

S5, randomly generating S phase shift matrices $\{\Theta^s\}_{s=1}^S$ based on the current probability phase shift matrix $p^{(t)}$ of the phase shifts of the IRS;

S6, calculating the objective $$\gamma = \frac{1 + |\sqrt{\rho}(h_{ru}^H \Theta H_t^H + h_{du}^H)F|^2/\delta_u^2}{1 + |\sqrt{\rho}(h_{re}^H \Theta H_t^H + h_{de}^H)F|^2/\delta_e^2};$$

S7, sorting $\{\gamma(\Theta^s)\}_{s=1}^S$ in a descending order as $\gamma(\Theta^{(1)}) \ge \gamma(\Theta^{(2)}) \ge \ldots \ge \gamma(\Theta^{(S)})$;

S8, selecting the first $S_{elite}$ values of the objectives $\gamma^{(1)}, \gamma^{(2)}, \ldots, \gamma^{(S_{elite})}$, where the corresponding phase shift matrix is $\{\Theta^s\}_{s=1}^{S_{elite}}$;

S9, updating the probability phase shift matrix $p^{(t+1)}$ based on $\{\Theta^s\}_{s=1}^{S_{elite}}$;

S10, updating the current iteration to be $i_2=i_2+1$;

S11, updating the current iteration to be $i_1=i_1+1$;

S12, obtaining the optimal phase shift matrix $\Theta^{opt}=\Theta^{(1)}$, and the secrecy rate of the IRS aided terahertz MISO system $R=\log_2 \gamma(\Theta^{(1)})$.

In the IRS aided terahertz MISO secure system of the present invention, since the traditional exhaustive search method must calculate all the phase shift combinations of the IRS elements, the possible combinations of the superabundant reflecting elements of the IRS increase exponentially. This significantly increases the computational complexity of the exhaustive search method. To overcome the tremendous calculation burden, the invention includes a cross-entropy based phase shift search method, which effectively reduces the computational complexity of the phase shift search of the IRS. Specifically, the cross-entropy based method updates the phase probability of each reflection element during the iterative processes, thereby causing the estimated phase shift matrix to gradually approach the optimal value. Therefore, the disclosed method of the present invention can improve the secrecy rate achievable for the system by optimizing the phase shift matrix and the precoding matrix with minimal computational complexity.

The advantages of the present invention are as follows:

Compared with the terahertz MISO secure communication system without IRS, the cross-entropy based method for the IRS-aided secure system is able to significantly improve the secrecy of the communication.

Besides, the disclosed cross-entropy based method in the present invention is easily achieved by hardware and applied in communication due to minimal computational complexity.

DETAILED DESCRIPTION OF THE EMBODIMENTS

The details of the present invention will be described as follows.

Figure 1:
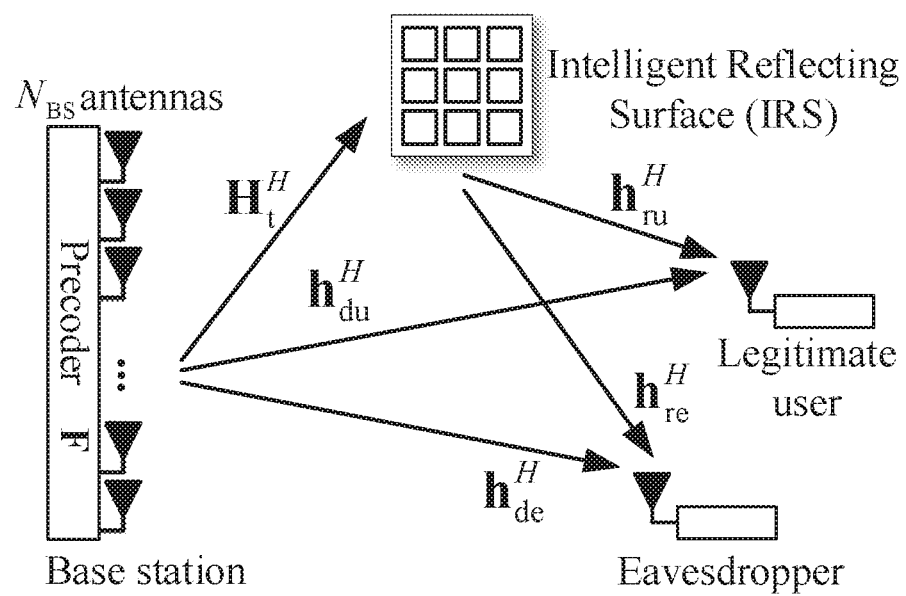
FIG. 1 shows the IRS aided downlink MISO terahertz communication system.

As shown in FIG. 1, considering a downlink terahertz MISO system, a BS with $N_{BS}$ array antennas communicates to a single-antenna authorized user, in the presence of a single-antenna eavesdropper. Since there are obstacles between the BS and the mobile user, the line-of-sight terahertz communication link is easily blocked. In order to overcome the hindrance, the IRS equipped with $N_{IRS}$ reflecting elements is fixed on a surrounding wall or ceiling. All of the reflecting elements are controlled by a central controller that is connected to the BS by wires or wirelessly to share the channel state information between the BS and the IRS. In addition, a simple, low-price, low-power-consumption sensor is installed on each reflecting element, which allows mass production. The phase of the terahertz wave beams at the IRS is sensed, and then this phase information is transmitted to the central controller to intelligently controlled the phase shifts of each reflecting element on the received the wave beams, so as to improve the secrecy rate performance of the terahertz system. Since the terahertz communication suffers from high path loss, assuming the terahertz waves can be reflected on the IRS up to one time. Therefore, when the BS transmits one single data stream $s \in C$, the received signals $y_u \in C$ for the authorized user and $y_e \in C$ for the eavesdropper can be respectively expressed as $$y_u = \sqrt{\rho}(h_{ru}{}^H \Theta H_t{}^H + h_{du}{}^H)Fs + n_u$$

$$y_e = \sqrt{\rho}(h_{re}{}^H \Theta H_t{}^H + h_{de}{}^H)Fs + n_e$$

where $H_t$ is the channel between the BS and the IRS, $h_{ru}$ is the channel between the IRS and the authorized user, $h_{du}$ is the channel between the BS and the authorized user, $h_{re}$ is the channel between the IRS and the eavesdropper, $h_{de}$ is the channel between the BS and the eavesdropper, $\rho$ is the average receiving power, $n_u$ and $n_e$ are channel noise where the noise power is $\delta^2$, $F \in C^{N_{BS} \times 1}$ is the hybrid precoding matrix satisfying the normalized power constraint of $\|F\|_F^2 = 1$, $$\Theta = diag([\beta_1 e^{j\theta_1}, \beta_2 e^{j\theta_2}, L, \beta_{N_{IRS}} e^{j\theta_{N_{IRS}}}]^T) \in C^{N_{IRS} \times N_{IRS}}$$

is the phase shift matrix of the IRS; for the diagonal matrix with $N_{IRS} \times N_{IRS}$ elements, $\{\beta_i\}_{i=1}^{N_{IRS}} \in [0,1]$ is the reflecting coefficient of the reflecting elements of the IRS, and $\{\theta_i\}_{i=1}^{N_{IRS}} \in [0,2\pi]$ is the phase shift for each reflecting element on the wave beam. For simplicity, assuming $\{\beta_i\}_{i=1}^{N_{IRS}} = 1$. In other non-ideal cases, the following formula derivation and the proposed algorithm are still feasible. And for the practical implementations, the phase shifts of the IRS are discretized, where the phase shift $\{\theta_i\}_{i=1}^{N_{IRS}}$ of each reflecting element belongs to the discrete phase shift set F. With the different construction of the IRS, the values of F are different. Conveniently, $F=(0, \Delta\theta, \ldots, \Delta\theta(2^b-1))$, where b is the bit quantization number and $\Delta\theta = 2\pi/2^b$ is the phase spacing.

The present invention aims to maximize the downlink secrecy rate $R_{sec} = [R_U - R_E]^+$, where $R_U$ is the data transmission rate of the authorized user and $R_E$ is the data transmission rate of the eavesdropper, and $R_U$ and $R_E$ are expressed as follows:

$$R_U = \log_2 \left[ 1 + \frac{|\sqrt{\rho}(h_{ru}^H \Theta H_t^H + h_{du}^H)F|^2}{\delta_u^2} \right],$$

$$R_E = \log_2 \left[ 1 + \frac{|\sqrt{\rho}(h_{re}^H \Theta H_t^H + h_{de}^H)F|^2}{\delta_e^2} \right],$$

where F is the precoding matrix at the BS, $\Theta$ is the phase shift matrix at the IRS. Besides, the function $R_{sec} = [R_U - R_E]^+$ means that when $R_{sec} = [R_U - R_E] > 0$, $R_{sec} = R_U - R_E$, otherwise $R_{sec} = 0$. Since the optimal value of our problem must be more than 0, the equation $R_{sec} = R_U - R_E$ is always satisfied.

The matrix F and $\Theta$ are jointly optimized to maximize the secrecy rate, and an objective function is established as follows:

$$(\Theta^{opt}, F^{opt}) = \operatorname{argmax} R_{sec},$$

s.t. $\theta_n \in F, \forall n = 1, \ldots, N_{IRS}$, $\Theta = diag([e^{j\theta_1}, e^{j\theta_2}, \ldots, e^{j\theta_{N_{IRS}}}]^T)$, $\|F\|_F^2 = 1$;

where the first constraint comes from the discretization of phase shifts of the reflecting elements of the IRS, the second constraint comes from the communication model of the IRS, and the third constraint comes from the normalized transmission power. The optimal precoding matrix $F^{opt}$ and phase shift matrix $\Theta^{opt}$ are obtained by solving the objective function.

Since this problem is related to nonconvex optimization, using current optimization techniques are hard to solve it. Fortunately, it is worth noting that there are still some implicit properties existing in this problem. Firstly, the number of the phase shift matrix $\Theta$ of the IRS is finite since each phase shift $\{\theta_n\}_{n=1}^{N_{IRS}}$ of $\Theta$ is discrete. Secondly, the precoding matrix F is an unconstrained matrix. Thirdly, the phase shift matrix $\Theta$ is independent of F. Based on these distinguishing features, such an optimization problem can be settled by iteratively optimizing $\Theta$ and F, where $\Theta$ is optimized when F is fixed, and F is optimized when $\Theta$ is fixed, respectively. Through multiple iterations, the $\Theta$ and F both converge to obtain the optimal solution.

When $\Theta$ is fixed, F is optimized and the secrecy rate is maximized by $$\max_F \log_2 \left[ \frac{1 + |\sqrt{\rho}(h_{ru}^H \Theta H_t^H + h_{du}^H)F|^2 / \delta_u^2}{1 + |\sqrt{\rho}(h_{re}^H \Theta H_t^H + h_{de}^H)F|^2 / \delta_e^2} \right]$$

s.t. $\|F\|_F^2 = 1$.

Note that this problem mentioned above is a typical secrecy rate optimization problem for a MISO system without the IRS, which has many solutions at present, and thus the equivalent form of this problem can be given by $$\max_F \frac{F^H A F}{F^H B F}$$

s.t. $\|F\|_F^2 = 1$, where $A = I_{N_{BS}} + \frac{\rho}{\delta_u^2}(h_{ru}^H \Theta H_t^H + h_{du}^H)^H (h_{ru}^H \Theta H_t^H + h_{du}^H)$, $B = I_{N_{BS}} + \frac{\rho}{\delta_e^2}(h_{re}^H \Theta H_t^H + h_{de}^H)^H (h_{re}^H \Theta H_t^H + h_{de}^H)$;

where $I_{N_{BS}}$ is an identity matrix with size $N_{BS} \times N_{BS}$, according to the Rayleigh-Ritz theorem, the optimal precoding matrix can be expressed as $F^{opt} = u_{max}(A,B) / \|u_{max}(A,B)\|^2$, where $u_{max}(A,B)$ is the generalized eigenvector based on the largest generalized eigenvalue of matrix $B^{-1}A$, and the matrix A and B are respectively expressed as $A = I_{N_{BS}} + \frac{\rho}{\delta_u^2}(h_{ru}^H \Theta H_t^H + h_{du}^H)^H (h_{ru}^H \Theta H_t^H + h_{du}^H)$, $B = I_{N_{BS}} + \frac{\rho}{\delta_e^2}(h_{re}^H \Theta H_t^H + h_{de}^H)^H (h_{re}^H \Theta H_t^H + h_{de}^H)$;

When F is fixed, $\Theta$ is optimized and the secrecy rate is maximized by $$\max_\Theta \gamma = \frac{1 + |\sqrt{\rho}(h_{ru}^H \Theta H_t^H + h_{du}^H)F|^2 / \delta_u^2}{1 + |\sqrt{\rho}(h_{re}^H \Theta H_t^H + h_{de}^H)F|^2 / \delta_e^2}$$

s.t. $\theta_n \in F, \forall n = 1, \ldots, N_{IRS}$, $\Theta = diag([e^{j\theta_1}, e^{j\theta_2}, \ldots, e^{j\theta_{N_{IRS}}}]^T)$.

The objective function γ is solved by optimizing the Θ. It notes that as the phase shift of the reflecting element is discrete and satisfies $\theta_n \in F, \forall n=1, \ldots, N_{IRS}$, the number of possible phase-shift matrix Θ is finite. The problem of maximizing the value of γ is solved by exhaustively comparing all the matrix Θ and finding the optimal matrix $\Theta^{opt}$. But the exhaustive search method has high computational complexity, which needs to compute the value γ of $|F|^{N_{IRS}}$ times for different matrices Θ. In order to decrease the complexity of phase searching, a cross-entropy based phase searching algorithm is disclosed in the present invention, which is suitable for the application in practice. The cross-entropy based phase searching algorithm is an iterative algorithm. At each iterative process, the probability of the phase shift for each reflecting element is estimated by calculating the system data transmission rate of a part of matrices Θ of the IRS. With the increasing number of iterations, the phase shift matrix estimated by this algorithm is close to the phase shift matrix corresponding to the optimal system data transmission rate. The proposed algorithm can effectively reduce the searching times and computational complexity of the phase shift matrix of the IRS compared with the exhaustive search method for finding the optimal phase simultaneously from all the reflecting elements. Assuming the probability matrix of the IRS as $p=[p_1, p_2, \ldots, p_N] \in C^{2^b \times N_{IRS}}$ where $\{p_n\}_{n=1}^{N_{IRS}} = [p_{n,1}, p_{n,2}, \ldots, p_{n,2^b}]^T \in C^{2^b}$ is the phase probability of the nth reflecting element. $p_{n,i}$ is the probability of the ith phase in F of n reflecting elements, and satisfies the probability constraints as $0 \leq p_{n,i} \leq 1$ and $$\sum_{i=1}^{2^b} p_{n,i} = 1.$$

Because the optimal selection for the reflecting element capable of best optimizing the system performance cannot be determined, the probability matrix is set to be equal, that is, $$p^{(0)} = \frac{1}{2^b} \times 1_{2^b \times N_{IRS}}$$

for the first iterative process, where $1_{2^b \times N_{IRS}}$ is an all-ones matrix with size $2^b \times N_{IRS}$. In the cross-entropy based phase searching algorithm, S phase shift matrices $\{\Theta^s\}_{s=1}^S$ are randomly generated according to the phase probability matrix $p^{(i)}$ the effective channel $H_{eff} = H_r^H \Theta H_t^H + H_d^H$ and the corresponding value γ are computed. Then, the values $\{\gamma(\Theta^s)\}_{s=1}^S$ is sorted in a descending order as $\gamma(\Theta^{(1)}) \geq \gamma(\Theta^{(2)}) \geq \ldots \geq \gamma(\Theta^{(S)})$. The first $S_{elite}$ values $\gamma^{(1)}, \gamma^{(2)}, \ldots, \gamma^{(S_{elite})}$ are extracted, corresponding to matrices $\{\Theta^s\}_{s=1}^{S_{elite}}$, and then $p^{(i+1)}$ is updated based on $\{\Theta^s\}_{s=1}^{S_{elite}}$, thereby approaching the probability matrix corresponding to the optimal phase shift matrix. The step mentioned above is repeated $I_2$ times to achieve the iterative process. The optimal phase shift matrix $\Theta^{opt}$ can be obtained as $\Theta^{opt} = \Theta^{(1)}$. When the optimal phase shift matrix and the optimal precoding matrix are obtained, the secrecy rate of the downlink IRS aided terahertz MISO system is calculated as $R = \log_2 \gamma(\Theta^{(1)})$.

The complexity analyses of different phase search methods, including the exhaustive search method and the cross-entropy based method, are present as follow. Specifically, the computational complexity of the exhaustive phase search method is mainly from searching all the possible phase shift matrices, which is expressed as $O(|F|^{N_{IRS}})$, while the computational complexity of the cross-entropy based phase search method is from a part of the possible phase shift matrices, which is expressed as is $O(S \cdot I_2)$.

| Methods | Complexity |
| --- | --- |
| Exhaustive search method | $O(|F|^{N_{IRS}})$ |
| Cross-entropy based method | $O(S \cdot I_2)$ |

Figure 2:
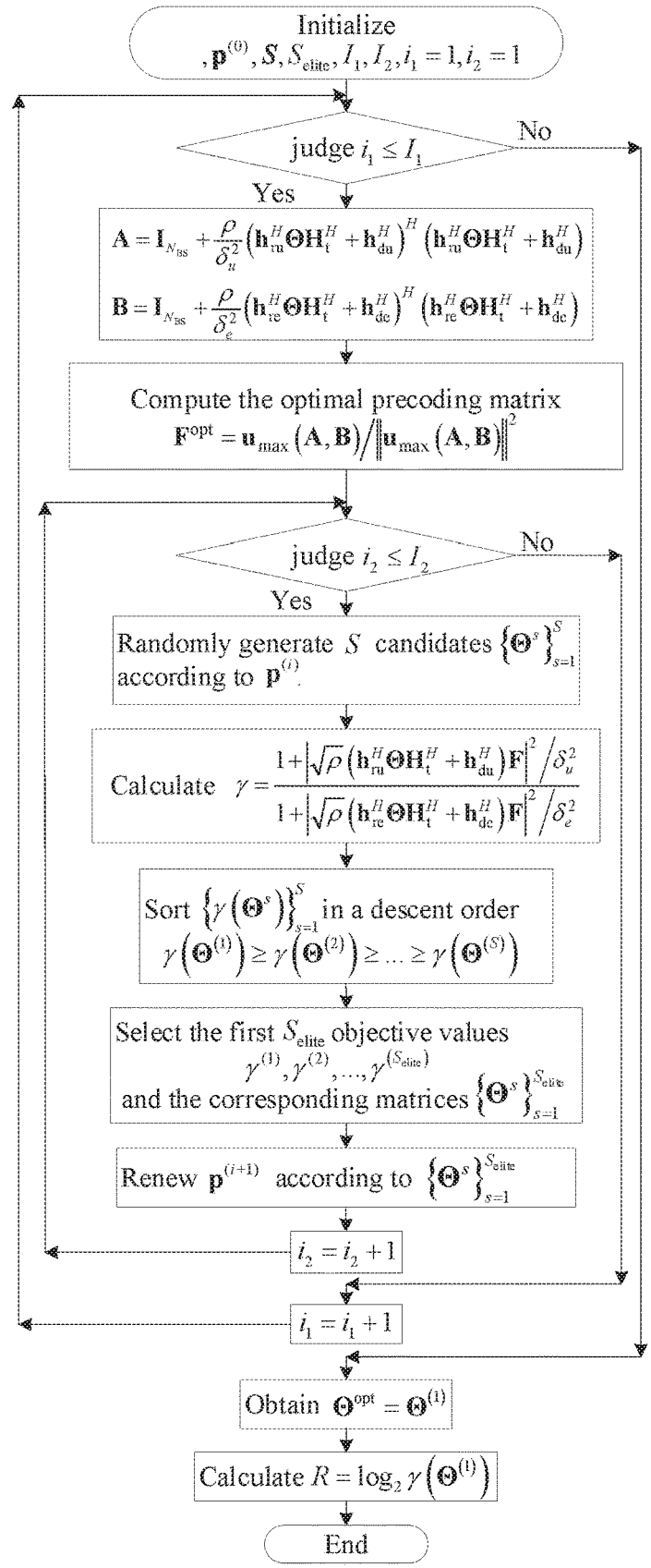
FIG. 2 shows the flow chart of the disclosed cross entropy based method.

Based on the above system model, the present invention discloses a cross-entropy based phase search method to maximize the secrecy rate of downlink IRS aided terahertz MISO system. Compared with the exhaustive search method, the method of the present invention can effectively reduce the computational complexity with slight secrecy rate performance penalty. FIG. 2 is the flow chart of the optimization process of maximizing the secrecy rate according to the disclosed cross-entropy based phase search method.

Embodiment

The present embodiment is based on the MATLAB simulation platform.

The solution for solving the achievable secrecy rate optimization problem is as follows.

S1, Setting the parameters of IRS aided terahertz MISO secure communication system, where the frequency is f=0.22 THz, the number of antennas at the BS is $N_{BS}=128$, the number of the IRS reflecting element is $N_{IRS}=32$, the discrete phase set of the IRS is $F=\{0, \pi/2, \pi, 3\pi/2\}$, and the channels $H_t \text{、} h_{ru} \text{、} h_{re} \text{、} h_{du} \text{、} h_{de}$ are presented by the geometric channel model, and $H_t$ can be expressed as $$H_t = \sqrt{\frac{N_{BS} N_{IRS}}{L}} \sum_{l=1}^L \alpha_l a_{BS}(\theta_{BS}) a_{IRS}^H(\theta_{IRS}),$$

where the number of paths of the BS-IRS link is L=3, the path gain is $\alpha \in CN(0,1)$, the physical direction angles $\theta_{IRS}$ and $\theta_{BS}$ are uniformly generated in $[0, 2\pi]$. The array response vector is $$a(\theta_{BS}) = \frac{1}{\sqrt{N_{BS}}} [1, L, e^{j(N_{BS}-1)2\pi d \sin(\theta_{BS})/\lambda}]^T,$$

where the antennas spacing $d=\lambda/2=c/(2f)$, and the velocity of light $c=3 \times 10^8$ m/s. The other array response vector can be also expressed according to the expression of $a(\theta_{BS})$. Besides, the other channels can be also expressed according to $H_t$.

S2, Initialization: The optional phase set of the IRS $$F = \left\{0, \frac{2\pi}{2^b}, L, \frac{2\pi}{2^b}(2^b - 1)\right\},$$

where the bit quantization number is set as b=2. The initial probability phase shift matrix of the IRS is $$p^{(0)} = \frac{1_{2^b \times N_{IRS}}}{2^b},$$

where $$1_{2^b \times N_{IRS}}$$

is an all-ones matrix with size $2^b \times N_{IRS}$. The total number of the iterations for the algorithm is $I_1=10$. The current iteration is $i_1=1$. The total number of the iterations for sub-algorithm is $I_2=10$. The current iteration is $i_2=1$. The number of samples of the phase shift matrix is S=200. The number of optimal samples for each iteration is $S_{elite}=40$.

S3, When $i_1 \le I_1$, cyclically performing S4-S12

S4, Calculating the optimal precoding matrix $F^{opt}=u_{max}(A,B)/\|u_{max}(A,B)\|^2$, where $u_{max}(A,B)$ is the generalized eigenvector based on the largest generalized eigenvalue of matrix $B^{-1}A$, and the matrix A and B are respectively expressed as $$A = I_{N_{BS}} + \frac{\rho}{\delta_u^2}(h_{ru}^H \Theta H_t^H + h_{du}^H)^H (h_{ru}^H \Theta H_t^H + h_{du}^H),$$

$$B = I_{N_{BS}} + \frac{\rho}{\delta_e^2}(h_{re}^H \Theta H_t^H + h_{de}^H)^H (h_{re}^H \Theta H_t^H + h_{de}^H),$$

where $I_{N_{BS}}$ is an identity matrix with size $N_{BS} \times N_{BS}$;

S5, When $i_2 \le I_2$, cyclically performing S5-S10

S6, Randomly generating S phase shift matrix $\{\Theta^s\}_{s=1}^S$ based on the current probability matrix $p^{(i)}$ of the phase shifts of the IRS;

S7, Calculating the objective $$\gamma = \frac{1 + |\sqrt{\rho}(h_{ru}^H \Theta H_t^H + h_{du}^H)F|^2 / \delta_u^2}{1 + |\sqrt{\rho}(h_{re}^H \Theta H_t^H + h_{de}^H)F|^2 / \delta_e^2};$$

S8, Sorting $\{\gamma(\Theta^s)\}_{s=1}^S$ in a descending order as $\gamma(\Theta^{(1)}) \ge \gamma(\Theta^{(2)}) \ge \ldots \ge \gamma(\Theta^{(S)})$;

S9, Selecting the first $S_{elite}$ objective values $\gamma^{(1)}, \gamma^{(2)}, \ldots, \gamma^{(S_{elite})}$, where the corresponding phase shift matrix is $\{\Theta^s\}_{s=1}^{S_{elite}}$;

S10, Updating the probability matrix $p^{(i+1)}$ based on $\{\Theta^s\}_{s=1}^{S_{elite}}$;

S11, Updating the current iteration to be $i_2=i_2+1$;

S12, Updating the current iteration to be $i_1=i_1+1$;

S13, Obtaining the optimal phase shift matrix $\Theta^{opt}=\Theta^{(1)}$;

S14, Calculating the secrecy rate $R=\log_2 \gamma(\Theta^{(1)})$ of the IRS aided terahertz MISO system.

The method of the present invention is tested by simulations to compare the secrecy rate performance and computational complexity of the exhaustive search method and the cross-entropy based search method. The results indicate that with the number of the reflecting elements $N_{IRS}$ increasing, the complexity gap between the cross-entropy based search method and the exhaustive search method becomes larger. Therefore, the cross-entropy based search method is used for the secrecy rate optimization of the IRS aided terahertz MISO system, which not only significantly reduces the computational complexity but also reduces the loss of the system date transmission rate.

The invention claimed is:

1. A design method for an intelligent reflecting surface (IRS) aided terahertz secure communication system, wherein, the IRS aided terahertz secure communication system comprises a base station (BS) equipped with $N_{BS}$ antennas, an IRS equipped with $N_{IRS}$ reflecting elements, and a single-antenna mobile user side and a single-antenna eavesdropper;

the BS transmits wave beam signals to a relay consisting of the IRS through active hybrid beamforming, and the IRS adjusts phase shifts of all the reflecting elements to transmit the wave beam signals to the single-antenna mobile user side and simultaneously suppress a received signal of the single-antenna eavesdropper;

terahertz waves are reflected by the IRS once;

when the BS transmits one single data stream $s \in C$, a received signal $y_u \in C$ of the single-antenna mobile user side and the received signal $y_e \in C$ of the single-antenna eavesdropper are expressed as $$y_u = \sqrt{\rho}(h_{ru}^H \Theta H_t^H + h_{du}^H)Fs + n_u;$$

$$y_e = \sqrt{\rho}(h_{re}^H \Theta H_t^H + h_{de}^H)Fs + n_e;$$

where $H_t$ is a channel between the BS and the IRS; $h_{ru}$ is a channel between the IRS and an authorized user side; $h_{du}$ is a channel between the BS and the authorized user side; $h_{re}$ is a channel between the IRS and the single-antenna eavesdropper; $h_{de}$ is a channel between the BS and the single-antenna eavesdropper; $\rho$ is an average receiving power; $n_u$ and $n_e$ are channel noises where channel noise power is $\delta^2$, $F \in C^{N_{BS} \times 1}$ is a hybrid precoding matrix satisfying a normalized power constraint of $\|F\|_F^2=1$;

$$\Theta = diag\left(\left[\beta_1 e^{j\theta_1}, \beta_2 e^{j\theta_2}, L, \beta_{N_{IRS}} e^{j\theta_{N_{IRS}}}\right]^T\right) \in C^{N_{IRS} \times N_{IRS}}$$

is a phase shift matrix of the IRS where $\{\beta_i\}_{i=1}^{N_{IRS}} \in [0,1]$ is a reflecting coefficient and $\{\theta_i\}_{i=1}^{N_{IRS}} \in [0,2\pi]$ is a phase shift for each reflecting element, wherein $\{\beta_i\}_{i=1}^{N_{IRS}}=1$; the phase shift of the IRS is discrete, where the phase shift $\{\theta_i\}_{i=1}^{N_{IRS}}$ of each reflecting element belongs to a discrete phase set F, and $F=\{0, \Delta\theta, \ldots, \Delta\theta(2^b-1)\}$, where b is a bit quantization number and $\Delta\theta=2\pi/2^b$ is a phase spacing;

a downlink secrecy rate $R_{sec}=[R_U-R_E]^+$ is maximized, where $R_U$ is a data transmission rate of the authorized user side and $R_E$ is a data transmission rate of the single-antenna eavesdropper:

$$R_U = \log_2\left[1 + \frac{|\sqrt{\rho}(h_{ru}^H \Theta H_t^H + h_{du}^H)F|^2}{\delta_u^2}\right],$$

$$R_E = \log_2\left[1 + \frac{|\sqrt{\rho}(h_{re}^H \Theta H_t^H + h_{de}^H)F|^2}{\delta_e^2}\right],$$

where F is a precoding matrix at the BS, $\Theta$ is the phase shift matrix at the IRS, the function $R_{sec}=[R_U-R_E]^+$ indicates that when $R_{sec}=[R_U-R_E]>0$, $R_{sec}=R_U-R_E$, when $R_{sec}=[R_U-R_E]<0$, $R_{sec}=0$;

F and $\Theta$ are jointly optimized to maximize the downlink secrecy rate, and an objective function established as follows $$(\Theta^{opt}, F^{opt}) = \mathrm{argmax}\, R_{sec},$$

$$\mathrm{s.t.}\ \theta_n \in F, \forall\, n = 1, \ldots, N_{IRS},$$

$$\Theta = diag([e^{j\theta_1}, e^{j\theta_2}, \ldots, e^{j\theta_{N_{IRS}}}]^T),$$

$$\|F\|_F^2 = 1;$$

where the first constraint comes from discretization of the phase shifts of the IRS, the second constraint comes from a communication model of the IRS, and the third constraint comes from a normalized transmission power; an optimal precoding matrix $F^{opt}$ and an optimal phase shift matrix $\Theta^{opt}$ are obtained by solving the objective function; the objective function is solved by the following steps:

S1, performing an initialization, wherein the discrete phase set of the IRS is $$F = \left\{0, \frac{2\pi}{2^b}, L, \frac{2\pi}{2^b}(2^b - 1)\right\},$$

where b is the bit quantization number; an initial probability phase shift matrix of the IRS is $$p^{(0)} = \frac{1_{2^b \times N_{IRS}}}{2^b},$$

where $$1_{2^b \times N_{IRS}}$$

is an all-ones matrix with size $2^b \times N_{IRS}$, a total number of the iterations of an algorithm is $I_1$, a current iteration of the algorithm is $i_1 = 1$, a total number of the iterations of a sub-algorithm $I_2$, a current iteration of the sub-algorithm is $i_2 = 1$, a number of samples of the phase shift matrix for each iteration is S, a number of optimal samples of the phase shift matrix for each iteration is $S_{elite}$;

S2, when $i_1 \le I_1$, cyclically performing S3-S11;

S3, computing the optimal precoding matrix $F^{opt} = u_{max}(A,B)/\|u_{max}(A,B)\|^2$, where $u_{max}(A,B)$ is a generalized eigenvector based on a largest generalized eigenvalue of a matrix $B^{-1}A$, and a matrix A and a matrix B are respectively written as $$A = I_{N_{BS}} + \frac{\rho}{\delta_u^2}(h_{ru}^H \Theta H_t^H + h_{du}^H)^H (h_{ru}^H \Theta H_t^H + h_{du}^H),$$

$$B = I_{N_{BS}} + \frac{\rho}{\delta_e^2}(h_{re}^H \Theta H_t^H + h_{de}^H)^H (h_{re}^H \Theta H_t^H + h_{de}^H);$$

where $I_{N_{BS}}$ is an identity matrix with size $N_{BS} \times N_{BS}$;

S4, when $i_2 \le I_2$, cyclically performing S5-S10

S5, randomly generating S phase shift matrices $\{\Theta^s\}_{s=1}^S$ based on a current phase probability matrix $p^{(i)}$ of the phase shifts of the IRS;

S6, calculating an objective $$\gamma = \frac{1 + |\sqrt{\rho}\,(h_{ru}^H \Theta H_t^H + h_{du}^H)F|^2/\delta_u^2}{1 + |\sqrt{\rho}\,(h_{re}^H \Theta H_t^H + h_{de}^H)F|^2/\delta_e^2};$$

S7, sorting $\{\gamma(\Theta^s)\}_{s=1}^S$ in a descending order as $\gamma(\Theta^{(1)}) \ge \gamma(\Theta^{(2)}) \ge \ldots \ge \gamma(\Theta^{(S)})$;

S8, selecting first $S_{elite}$ objective values $\gamma^{(1)}, \gamma^{(2)}, \ldots, \gamma^{(S_{elite})}$, where a corresponding phase shift matrix is $\{\Theta^s\}_{s=1}^{S_{elite}}$;

S9, updating the probability matrix $p^{(i+1)}$ based on $\{\Theta^s\}_{s=1}^{S_{elite}}$;

S10, updating the current iteration of the sub-algorithm to be $i_2 = i_2 + 1$;

S11, updating the current iteration of the algorithm to be $i_1 = i_1 + 1$; and

S12, obtaining the optimal phase shift matrix $\Theta^{opt} = \Theta^{(1)}$, wherein the downlink secrecy rate of the IRS aided terahertz secure communication system is $R = \log_2 \gamma(\Theta^{(1)})$.

* * * * *